United States Patent [19]

Parsons

[11] Patent Number: 4,650,442
[45] Date of Patent: Mar. 17, 1987

[54] CONTINUOUSLY VARIABLE TRANSMISSION

[75] Inventor: Frederick L. Parsons, Pearce, Ariz.

[73] Assignee: Neuberne H. Brown, Jr., Jensen Beach, Fla. ; a part interest

[21] Appl. No.: 776,815

[22] Filed: Sep. 17, 1985

[51] Int. Cl.⁴ .......................... F16H 9/16; F16G 1/08
[52] U.S. Cl. ...................................... 474/29; 474/237; 474/268
[58] Field of Search ................. 474/29, 201, 263, 265, 474/268, 270–272, 8, 903, 237, 166

[56] References Cited

U.S. PATENT DOCUMENTS 3,102,431  9/1963  Maurer .................................. 474/29
3,757,594  9/1973  Kumm .............................. 474/29 X
3,968,703  7/1976  Bellman ........................... 474/237 X

OTHER PUBLICATIONS

Gearless Transmissions Shift Out of "Park" Business Week Feb. 6, 1984, pp. 74–75.

CVT—The No-Shift Transmission, Popular Science, Jun., 1980, pp. 88–89.

Primary Examiner—Stephen J. Novosad
Assistant Examiner—Thuy M. Bui
Attorney, Agent, or Firm—Brumbaugh, Graves, Donohue & Raymond

[57] ABSTRACT

A continuously variable transmission has a driving pulley and a driven pulley each of which has a V-shaped groove in which sits the belt. The belt comprises a base portion of a rubber-like compound in which are imbedded a plurality of transverse metal pins each of which has exposed bent end portions whose tips are tapered to conform to the taper of the grooves and a plurality of cables imbedded in the base and extending longitudinally around the belt for stabilizing the length of the belt. The pulley walls are coupled to their corrseponding shaft by a resilient coupling which helps provide a desired clamping force on the belt and which includes a series of serrated members designed to exhibit a wedging action which provides the desired clamping force.

19 Claims, 7 Drawing Figures

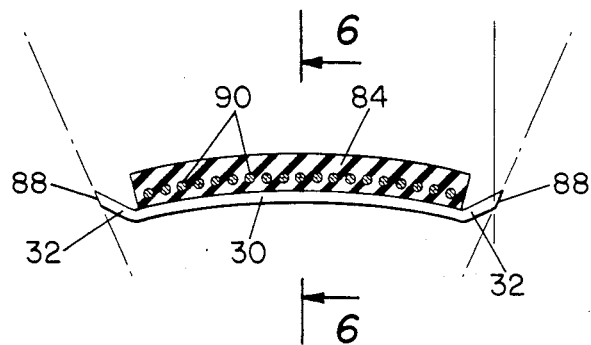
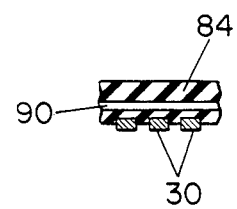
FIG. 4
FIG. 6
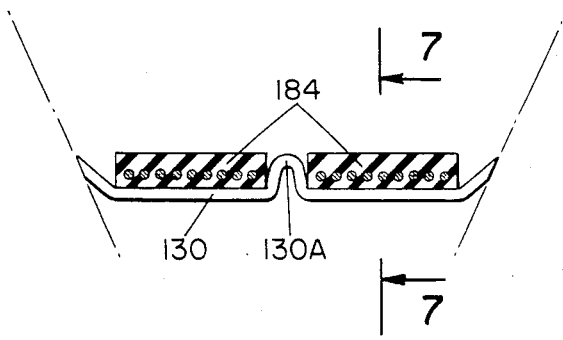
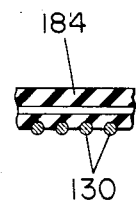
FIG. 5
FIG. 7

CONTINUOUSLY VARIABLE TRANSMISSION

FIELD OF THE INVENTION

This invention relates to a variable speed transmission system in which the ratio between a driving pulley and the driven pulley is continuously variable. The invention will be described with particular reference to use in an automobile but uses outside this field are also possible.

BACKGROUND OF THE INVENTION

Continuously variable transmission (CVT) has long been recognized as a likely answer to more efficient automatic transmissions but CVT has been relatively slow in gaining widespread commercial use. In Business Week, Feb. 6, 1984 at pages 74-75 there is discussed the basic approach to a currently popular form of CVT. As described therein CVT works by varying the working diameters of two pulleys, each of which is characterized by a V-shaped groove in which sits the pulley belt. To shift into a lower gear, the engine pulley spreads apart dropping the belt lower into its V-shaped groove and at the same time, the driven shaft pulley closes, forcing the belt to ride higher in its V-groove, thereby effectively decreasing the ratio of the diameters of the engine pulley and the drive shaft pulley.

A critical element of such a system is the belt used. Typically there is used a flexible steel belt with hundreds of steel plates strung together like the links of a watch band. In such a system, the drive shaft pulley pushes the driven shaft pulley into rotation by means of the segments of the belt which are pinched between the sidewalls of the respective groove.

An oil film is included between the walls of the groove formed by the pulley walls and the tips or edges of the steel belt to facilitate displacement of the belt when a speed change is made. Unfortunately, this oil film requires a very high contact force to enable the system to transfer torque between the pulleys and the drive belt. It is of course important that adequate clamping be maintained between the belt and the pulleys if either the pulley is to drive the belt or be driven by the belt without slipping. In particular, it is advantageous that the clamping force be proportional to the torque being transmitted. Moreover, it is important that these high clamping forces be little affected by shock or other load changes. Prior art CVTs have been deficient in these respects.

SUMMARY OF THE INVENTION

As one aspect of the invention, I have provided a novel belt for use in a CVT system which uses essentially a dry metal-to-metal contact between the walls of the groove and the belt, which contact is essentially slipless.

In particular, in accordance with this aspect of the invention, I use a belt which includes a rubber-compound base or matrix along one surface of which is imbedded over most of their interior length, a plurality of spaced transversely extending metal bands or pins, typically of hardened steel. Embedded in the interior of the rubber base are a plurality of longitudinally extending cables, typically of fiber glass. In a preferred embodiment, the unimbedded end portions of the pins or bands are bent and the tips are ground to an angle that matches the taper of the sidewalls of the grooves, which such tips are to contact. The trans-verse pins permit the belt to flex in the transverse direc-tion. The spacing open between the ends of the pins, coupled with their partially unimbedded relationship to the belt, promotes cooler running due to the motion in the air.

In a different aspect a CVT in accordance with my preferred embodiment also includes a novel arrangement for coupling the pulleys to their shafts that features inclusion of a resilient or elastomeric member that helps absorb shocks that, undampened, might adversely affect the opera-tion of the pulleys. This coupling supplies the propor-tional clamping forces required to overcome slip.

BRIEF DESCRIPTION OF THE DRAWINGS

FIGS. 4 and 5 are transverse sections through different forms of belts in accordance with the belt aspect of the invention, and FIGS. 6 and 7 are portions of a longitudinal section of the belts of FIGS. 4 and 5, respectively.

DETAILED DESCRIPTION OF THE INVENTION

Figure 1:
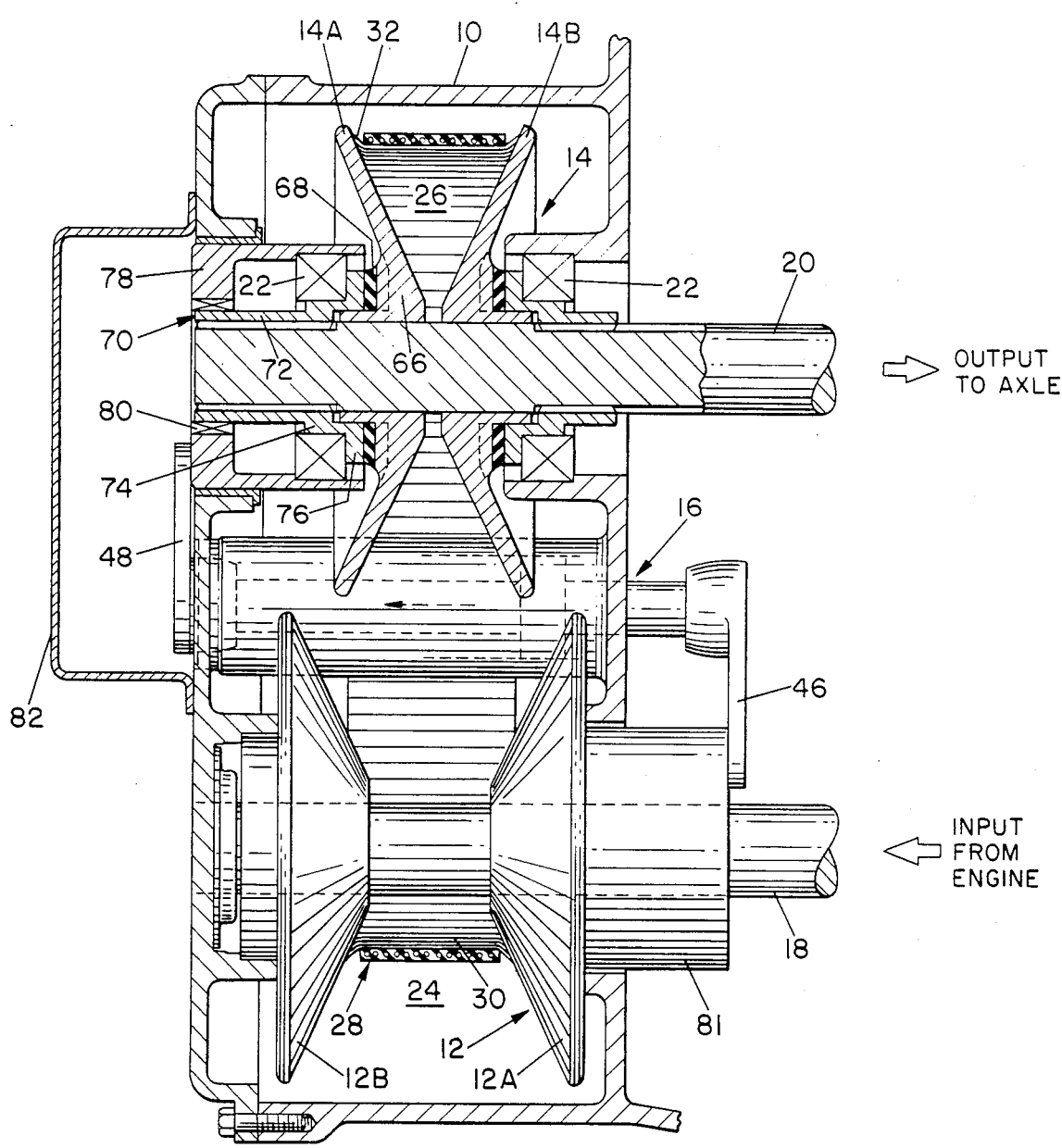
FIG. 1 shows an elevational view, partly in section to expose the interior details, of an embodiment of a CVT, in accordance with the invention.

Turning more specifically to the drawings, in FIG. 1 the transmission housing 10 supports within its interior the engine pulley 12 and the drive shaft pulley 14. Each of the pulleys has one sidewall fixed in the horizontal direction and the other movable in the horizontal direction, so that the spacing of the groove between the two sidewalls of each pulley is variable. The mechanism for controlling the spacing will be discussed in more detail below in conjunction with FIG. 2, but basically this mechanism is included in a hydraulic actuator unit 16. This actuator unit located between the two pulleys controls the position of the horizontally movable sidewall of each pulley. Since the movable sidewall is opposite for the two pulleys, one, for example being the right wall 12A in pulley 12 and the left wall 14A in pulley 14, movement of the horizontally movable wall 12A of pulley 12 to the left (as viewed in FIG. 1) decreases its spacing from the horizontally fixed wall 12B, whereas movement of the horizontally movable wall 14A of pulley 14 to the left increases its spacing from the horizontally fixed wall 14B. The opposite results are achieved when both walls 12A and 14A are moved to the right.

The engine pulley 12 is coupled to the shaft 18 which is linked to the engine (not shown) and the driven shaft pulley 14 is coupled to the driven shaft 20. The coupling will be described in more detail below. Bearings 22 are included to support rotation of the pulleys and shafts with respect to the housing in the usual fashion.

As is seen, the sidewalls of each of the pulleys 12 and 14 are slanted in the working parts of their widths so that the grooves 24 and 26, respectively, between the sidewalls are tapered, and their widths increase with distance from the pulley axes, which lie along the associated shafts 18 and 20, respectively.

The drive belt 28 rides between the two sidewalls of each of the two pulleys. As is described more fully hereinafter in connection with FIGS. 4 and 5, the belt 28 is provided with transverse metal bands or pins 30 whose end portions 32 are bent and ground at their tips to match the taper of the sidewalls so that a tight slipless contact is made between the tips and the sidewalls of the pulley. The bent ends provide a predesigned spring tension adequate to keep the tips pressed against the sidewalls.

When the sidewalls of pulley 12 are far apart as shown in FIG. 1, the belt 28 will be located close to the shaft 18, so that pulley 12 has a small effective radius and will make several rotations for each rotation of pulley 14 in which the belt 28 rides higher in the groove so that it has a larger effective radius. When the sidewalls of pulley 12 are moved closer together, thereby also moving the sidewalls of pulley 14 farther apart, the belt 28 will rise in pulley 12 and drop in pulley 14 and the ratio of the radii of the two pulleys will thereby change. As will be understood, FIG. 1 depicts the pulleys 12 and 14 in a very low ratio configuration, and any change would normally be in the direction of a higher ratio, i.e., so that the belt would rise in pulley 12 and drop in pulley 14.

Figure 2:
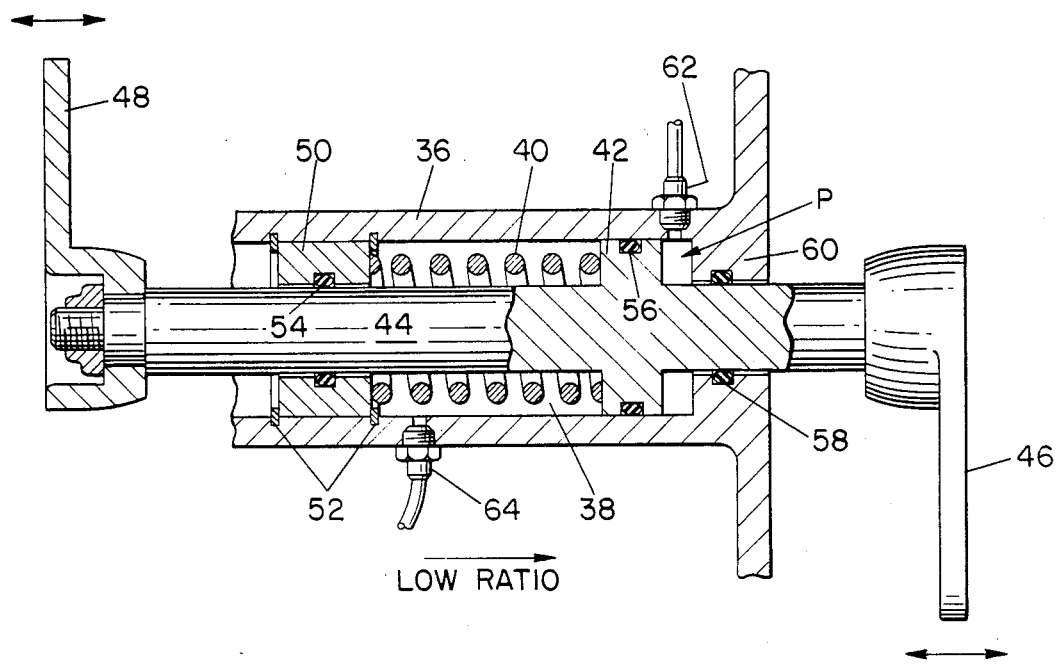
FIG. 2 shows on a larger scale and partly in section the portion of the CVT of FIG. 1 used to vary the pulley groove spacings.

Returning to the hydraulic actuator unit 16, shown in more detail in FIG. 2 and used to control the horizontal movement of the horizontally movable sidewalls 12A and 14A, it comprises a cylinder 36 defining a chamber 38 within which is a compression spring 40 which bears against and biases an axial plunger member 42 to the right. The plunger member 42 includes an axial shaft 44 extending axially through the chamber 38 and carrying at its opposite ends brackets 46 and 48 for engagement with the horizontal movable walls 12A and 14A, respectively, of the two pulleys 12 and 14 (see FIG. 1). An annular stop member 50 surrounds the shaft 44 and is axially captured within the chamber 38 by split rings 52. O-rings 54 and 56 carried by the plunger 42 and the stop member 50 seal the chamber 38 relative to the shaft 44 and the cylinder 36. A further O-ring 58 establishes a seal between the shaft 44 and the end wall 60 of the cylinder 36.

To effect a ratio change, fluid is introduced into and withdrawn from the chamber 38 by way of a fluid coupling 62 to urge the plunger 42 to the left against the bias of the spring 40. As illustrated in FIG. 2, the spring 40 normally biases the plunger to the low ratio configuration of FIGS. 1 and 2. The pressure provided by the fluid in cavity 38 is controlled by the factors which are normally used to determine the optimum effective gear ratio of an automatic transmission system and will not be discussed in detail herein. Other arrangements are known for controlling the movement and may be substituted. For example, a second fluid coupling 64 may be provided in place of or as a supplement to the spring 40 depending on the control system used.

Figure 3:
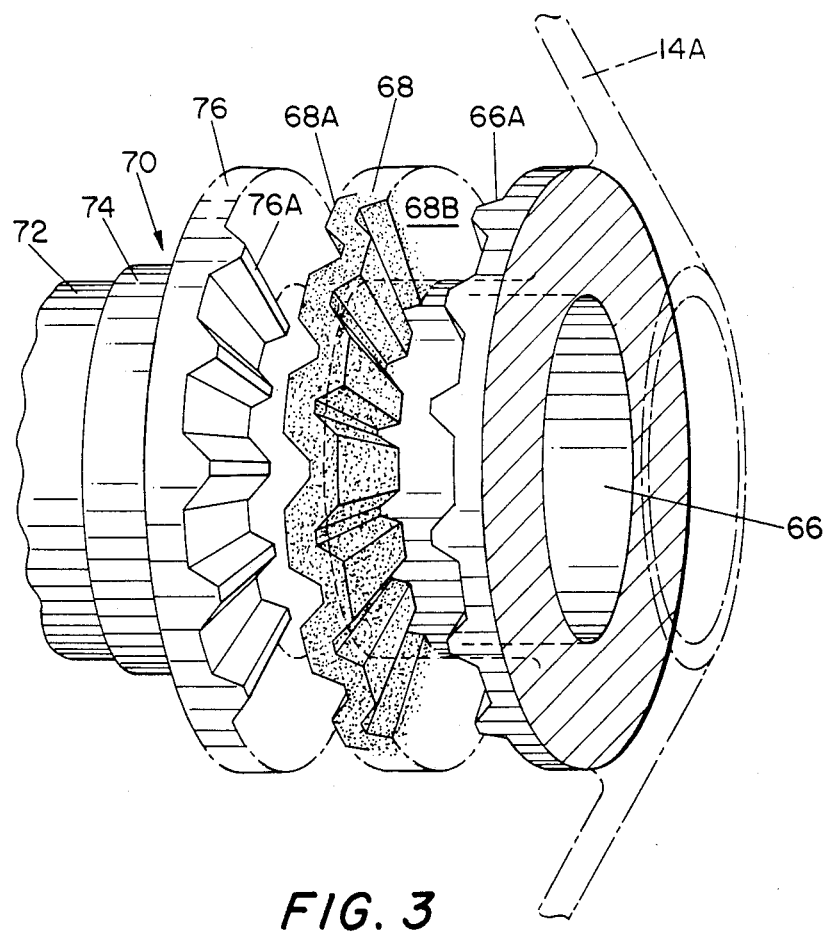
FIG. 3 is an exploded view of the arrangement including a resilient spacing member for supporting the driven pulley in accordance with the support aspect of the invention.

With reference to FIGS. 1 and 3, the manner in which shafts 18 and 20 are coupled to the sidewall members of the pulleys 12 and 14, respectively, will now be described. For illustrative purposes, the description will be made with reference to the connection for pulley sidewall 14A, but it will be understood to apply to the other pulley sidewalls as well.

As shown in FIG. 1, the sidewall member 14A contains an annular hub portion 66 that is rotatably mounted on the surface of shaft 20. There is no direct driving connection between the sidewall member 14A and the shaft 20. Rather, the driving connection is made through an intermediate resilient ring member 68 and an annular collar member 70. The collar member includes a first cylindrical portion 72 that is splined or otherwise rigidly connected to shaft 20 for rotation therewith. At its axially inner end the collar 70 includes an enlarged diameter portion 74 which forms a seat for the bearing 22 (see FIG. 1). Inwardly of the bearing seal portion 74, the collar is formed with an upstanding flange 76 which engages, in a manner more fully described hereinafter, the intermediate flex ring member 68. The outer bearing seat for the bearing 22 is carried by a non-rotating cap member 78 (FIG. 1) that fits over the collar member 70. To stabilize the unit a sealed bearing unit 80 is provided between the cap member 78 and the collar 70. As shown in FIG. 1, the bracket 48 of the actuator unit 16 engages the axially outer end of the cap member 78 for purposes of control of the width of groove 26 in pulley 14. The other end bracket 46 of the actuator unit 16 engages the axially inner end of a like cap member 81 associated with the movable sidewall member 12A of the pulley 12. An access cover 82 fits over the axially outer ends of the drive shaft 20 and the actuator 16.

As illustrated in FIG. 3, the facing surfaces 76A and 68A of the flange 76 and the ring member 68, respectively, are formed with matching wedge serrations to provide a secure driving engagement therebetween. The other surface 68B of ring member 68 and the facing surface 66A of the hub portion 66 of the sidewall member 14A (shown in phantom) are also formed with matching serrations for the like purpose. As mentioned, the ring member 68 is made of a resilient material, such as a suitable elastomer and is so proportioned as to wedge members 66 and 70 apart when one element is rotatably displaced with respect to the other. Because brackets 46 and 48 are rigid, the displacement can only be an inward clamping force on the belt. Firstly, and most importantly, since the driving member 76 is clamped by way of the serrations to the resilient member 68, the force clamping the two together will be dependent on the torque being applied to the clamping member 68 and this clamping force will be further transmitted as an inward clamping force between the pulley sidewall to which member 76 is bound and the belt. This force is proportional to the torque being applied. Additionally, this resilient member helps provide isolation against shocks which might affect the system deleteriously, although most of the vibration isolation is provided by the rotational flex or displacement between members 66 and 70.

Advantageously, a driving connection utilizing a resilient element 68, as described, is used between both the horizontally fixed and horizontally moveable sidewalls of each pulley with its associated shaft. In some instances, it may be sufficient if the resilient coupling is provided between only one of the sidewalls and its shaft. In other instances, it may prove sufficient to provide such resilient coupling between only one shaft and one or both of the pulley sidewalls associated with it.

It is to be recognized, that this aspect of the invention can be independent of the belt aspect of the invention and can find utility with other forms of belts. Alternatively, the novel form of belt can be used independently of this novel driving arrangement.

In particular in some instances, it may prove advantageous to use instead, the known "roller wedge" mechanism for coupling the shaft to the pulley wall. This mechanism can also be used to provide a strong clamping force between the belt and the pulley walls which is proportional to the torque applied. In this technique, a roller is enclosed between inwardly tapered portions of the shaft and that pulley wall, such that rotation, for example, of the shaft, coupled with resistance of the wall will cause the roller to try to climb the incline in its enclosure. However, because the shaft cannot move axially because of bearings in the housing, the shaft causes the wall to rotate as well as exert an inward or clamping force on the belt.

FIGS. 4 and 6 illustrate the structure of one embodiment of a drive belt in accordance with this feature of the invention. The belt comprises a matrix or base 84, typically of a rubber compound of the type useful in pulley belts. A plurality of transversely extending pins or bands 30 of generally rectangular cross section are imbedded in the base over most of their lengths, only the end portions 32 being free. The end portions 32 are bent and their tips 88 ground so that the belt will sit tightly between the sidewalls. Typically the edges will be ground to an angle of about 25 degrees from the vertical, and the sidewalls forming the grooves in the pulleys are tapered similarly. Other bevels may of course be used. Also imbedded in the base 84 is a plurality of cables or cords 90, suitably fiberglass or the like, which extend longitudinally along the length of the belt to increase its resistance to stretching during operation. Importantly the pins are spaced apart from one another in the longitudinal direction of the belt as seen best in FIG. 6.

FIGS. 5 and 7 show an alternative form of the belt which differs in several respects. In this form, the pins or bands 130 are circular in cross section. Additionally, the base 184 is divided transversely into two sections and each pin includes a central section 130A which is an inverted U to increase the flexibility of the belt particularly in the transverse direction.

As previously mentioned, an important characteristic of this belt is that it is designed to make essentially a metal-to-metal contact with the sidewalls of the groove during operation. A metal-to-metal contact is therefore established and maintained so long as the drive is active. Such a contact because of its high frictional characteristics, has many times the holding ability of to the contact in a drive in which torque is transmitted through an oil film. Moreover, though ordinarily it is preferred to run the belt completely dry, in some instances it may be useful to have an oil film initially present at the beginning of energizing the drive. In such a case the tips of the pin should be so shaped that any such film is rapidly squeezed out between the two working surfaces so that a metal-to-metal contact is quickly established and thereafter maintained as long as the drive is active.

It is important to avoid overheating of the belt which might destabilize the rubber base. Spacing the pins apart longitudinally and the use of exposed end portions for the metal pins acts to keep the belt from overheating by circulation. Moreover, having the pins only partially imbedded in the matrix also helps avoid overheating. A spacing apart longitudinally comparable to the width of the pin has been found particularly advantageous.

In the two embodiments shown, each of the pins comprises a slightly curved intermediate portion between a pair of end portions which are bent to provide spring action on the tapered tips to keep the tips pressed to the sidewalls. In some instances, it may prove advantageous to provide a more curved intermediate portion, the radius of curvature being chosen to provide an increase in the flexibility of the pins to improve the gripping action between the pin tips and the pulley sidewalls.

Especially in such instances, it may be advantageous to imbed the central portions of the pins more deeply in the rubber base.

The cables provide longitudinal strength and stability of the belt while permitting considerable flexibility in the transverse direction.

It should be apparent that there should be considerable latitude in the choice of materials forming the belt. For example, the rubber-like compound used for the base can take a variety of forms consistent with its desired characteristics of stability despite heating, strong support of the pins and enough flexibility to permit a tight fit even though the pin tips must be permitted to flex in and out as the spacing of the walls is varied. The effective dimension of the pin will change to allow speed change. Tangential initial contact later will be either lengthened or shortened. The pin tips must never lose contact with the pulleys so the pins must have the capacity to make this adjustment.

As previously mentioned, the pins are advantageously essentially of hardened steel but protective coatings may be useful.

Although the invention has been described with reference to specific embodiments thereof, it will be understood that such embodiments are illustrative only and that the invention is susceptible of variation and modification without departing from the inventive concepts disclosed. All such variations and modifications, therefore, are intended to be encompassed within the spirit and scope of the appended claims.

I claim:

1. In a continuous variable transmission comprising a driving pulley and a driven pulley, each of which has a pair of sidewalls which define therebetween a groove which is tapered over at least a portion of its height, means for varying the spacing in the grooved portions simultaneously in opposite senses, and a belt for riding in the grooved portions for coupling the two pulleys, the improvement comprising:

said belt comprises a base portion of a rubber-like compound in which are imbedded a plurality of transverse metal pins each of which has exposed bent end portions whose tips are tapered essentially to conform to the taper of the grooves whereby the belt fits closely within the grooves.

2. A continuous variable transmission in accordance with claim 1 in which the belt further includes a plurality of cables imbedded completely in the base and extending longitudinally for stabilizing the length of the belt.

3. A continuous variable transmission in accordance with claim 1 in which the intermediate portion of each pin is only partially imbedded in the rubber-like base portion.

4. A continuous variable transmission in accordance with claim 1 in which the metal pins are uniformly spaced apart along the length of the belt a distance which is comparable to their dimension along the belt.

5. A continuous variable transmission in accordance with claim 1 in which the pin are substantially rectangular in cross section.

6. A continuous variable transmission in accordance with claim 1 in which the pins are substantially circular in cross section.

7. A continuous variable transmission in accordance with claim 1 in which each pin includes a central portion which has an inverted U form.

8. The transmission of claim 1 in which at least one sidewall of one of said pulleys is coupled to its corresponding shaft by a coupling means which cooperates to provide a clamping force on the belt.

9. The transmission of claim 1 in which each sidewall of each pulley is coupled to its corresponding shaft by coupling means which includes a member which is resilient in the direction parallel to the axes of the shafts.

10. The transmission of claim 9 in which the coupling means comprises a resilient ring member whose opposed surfaces are serrated and which is inserted between a pair of similarly serrated members rigidly coupled to the pulley sidewall and the associated shaft, respectively.

11. A continuously variable transmission which includes a driving pulley and a driven pulley, each of which has a pair of sidewalls, a driving shaft and a driven shaft, and means for coupling at least one sidewall of the pulley to its corresponding shaft comprising a ring member coupled to the shaft, a ring member coupled to a pulley sidewall and a ring member of resilient material clamped between said two last-mentioned ring members in driving engagement.

12. The transmission of claim 11 in which the coupling means comprises a resilient ring member whose opposed surfaces are serrated for wedging action and which is inserted between a pair of similarly serrated members rigidly coupled to the shaft and at least one pulley sidewall, respectively.

13. The transmission of claim 11 in which the means for coupling each of the two pairs of sidewalls to its associated shaft is by way of a separate member which is resilient in the direction parallel to the axes of the shafts.

14. The transmission of claims 10 in which the coupling means comprises a resilient ring member whose opposed surfaces are serrated and which is inserted between a pair of similarly serrated members rigidly coupled to the pulley sidewall and the associated shaft, respectively.

15. A belt for use in a transmission system comprising a base portion of a rubber-like compound in which are imbedded a plurality of transverse metal pins, each of which has exposed bent end portions whose tips are tapered.

16. The belt of claim 15 in which a plurality of cables are imbedded completely in the base and extend longitudinally for stabilizing the length of the belt.

17. The belt of claim 16 in which the intermediate portion of each belt is only partially imbedded in the base portion.

18. The belt of claim 17 in which the metal pins are uniformly spaced apart, along the length of the belt, a distance which is comparable to their widths.

19. The belt of claim 18 in which each pin includes a central portion which has an inverted-U form.

* * * * *

UNITED STATES PATENT AND TRADEMARK OFFICE
CERTIFICATE OF CORRECTION

PATENT NO. : 4,650,442
DATED : March 17, 1987
INVENTOR(S) : Frederick L. Parsons It is certified that error appears in the above-identified patent and that said Letters Patent is hereby corrected as shown below:

Col. 5, line 44, "of to" should read --of--.

Col. 6, line 64, "pin" should read --pins--.

Col. 8, line 8, "claims 10" should read --claim 13--.

Signed and Sealed this

Eighteenth Day of August, 1987

*Attest:*

DONALD J. QUIGG

*Attesting Officer*     Commissioner of Patents and Trademarks